United States Patent
Kume

(10) Patent No.: US 6,439,553 B1
(45) Date of Patent: Aug. 27, 2002

(54) VIBRATION-PREVENTIVE SUPPORT DEVICE

(75) Inventor: Hideki Kume, Osaka (JP)

(73) Assignee: Funai Electric Co., Ltd., Daito (JP)

( * ) Notice: Subject to any disclaimer, the term of this patent is extended or adjusted under 35 U.S.C. 154(b) by 0 days.

(21) Appl. No.: 09/468,821

(22) Filed: Dec. 22, 1999

(30) Foreign Application Priority Data

Dec. 24, 1998 (JP) .......................................... 10-368252

(51) Int. Cl.$^7$ ................................................. F16F 7/00
(52) U.S. Cl. .............. 267/136; 267/140.11; 267/140.12
(58) Field of Search ................................ 267/136, 152, 267/153, 140, 141.2, 140.13, 292, 293, 140.11; 248/635; 114/219, 220; 293/136

(56) References Cited

U.S. PATENT DOCUMENTS

| | | | | |
|---|---|---|---|---|
| 4,286,777 A | * | 9/1981 | Brown ...................... 267/63 R |
| 4,545,316 A | * | 10/1985 | Yamaguchi et al. ........ 114/219 |
| 4,858,880 A | * | 8/1989 | Durand ...................... 248/635 |
| 4,884,656 A | * | 12/1989 | Baheti et al. ............... 181/207 |
| 5,219,306 A | * | 6/1993 | Takahashi ..................... 440/52 |
| 5,509,643 A | * | 4/1996 | Carstens et al. ........ 267/140.12 |
| 5,547,172 A | * | 8/1996 | Corcoran .............. 267/140.13 |
| 5,613,668 A | * | 3/1997 | Brunerye .................... 267/219 |
| 5,774,445 A | * | 6/1998 | Sawi et al. ................. 369/270 |
| 5,799,925 A | * | 9/1998 | Kumita et al. .............. 248/642 |
| 5,799,930 A | * | 9/1998 | Willett ..................... 267/141.4 |
| 5,975,000 A | * | 11/1999 | Nakamura .................. 114/219 |
| 5,996,959 A | * | 12/1999 | Gassen et al. .............. 248/635 |

FOREIGN PATENT DOCUMENTS

| | | | |
|---|---|---|---|
| DE | 3316870 A1 | * | 5/1983 |
| DE | 4431772 A1 | * | 3/1996 |
| EP | 0092893 A1 | * | 11/1983 |
| JP | 6235126 A | * | 2/1987 |
| JP | 7-37375 | | 2/1995 |
| JP | 8-63952 | | 3/1996 |
| JP | 101927 A | * | 1/1998 |

* cited by examiner

*Primary Examiner*—Christopher P. Schwartz
*Assistant Examiner*—Melody M. Burch
(74) *Attorney, Agent, or Firm*—Crowell & Moring LLP

(57) ABSTRACT

A vibration-preventive support device, in which an inner cylindrical body is disposed within an outer cylindrical body and a vibration absorbing body is disposed in such a manner that the two ends thereof are respectively connected to the lower end side end edge of the outer cylindrical body and the upper end side end edge of the inner cylindrical body. At this time, the outer cylindrical body, inner cylindrical body and vibration absorbing body are formed in an integrally united body by molding elastic material, that is, rubber. The vibration preventive support device is arranged such that, in a first condition, the inner cylindrical body is entirely outside a volume encompassed by the outer cylindrical body and, in a second condition, the inner cylindrical body is disposed within the encompassed volume of the outer cylindrical body.

7 Claims, 5 Drawing Sheets

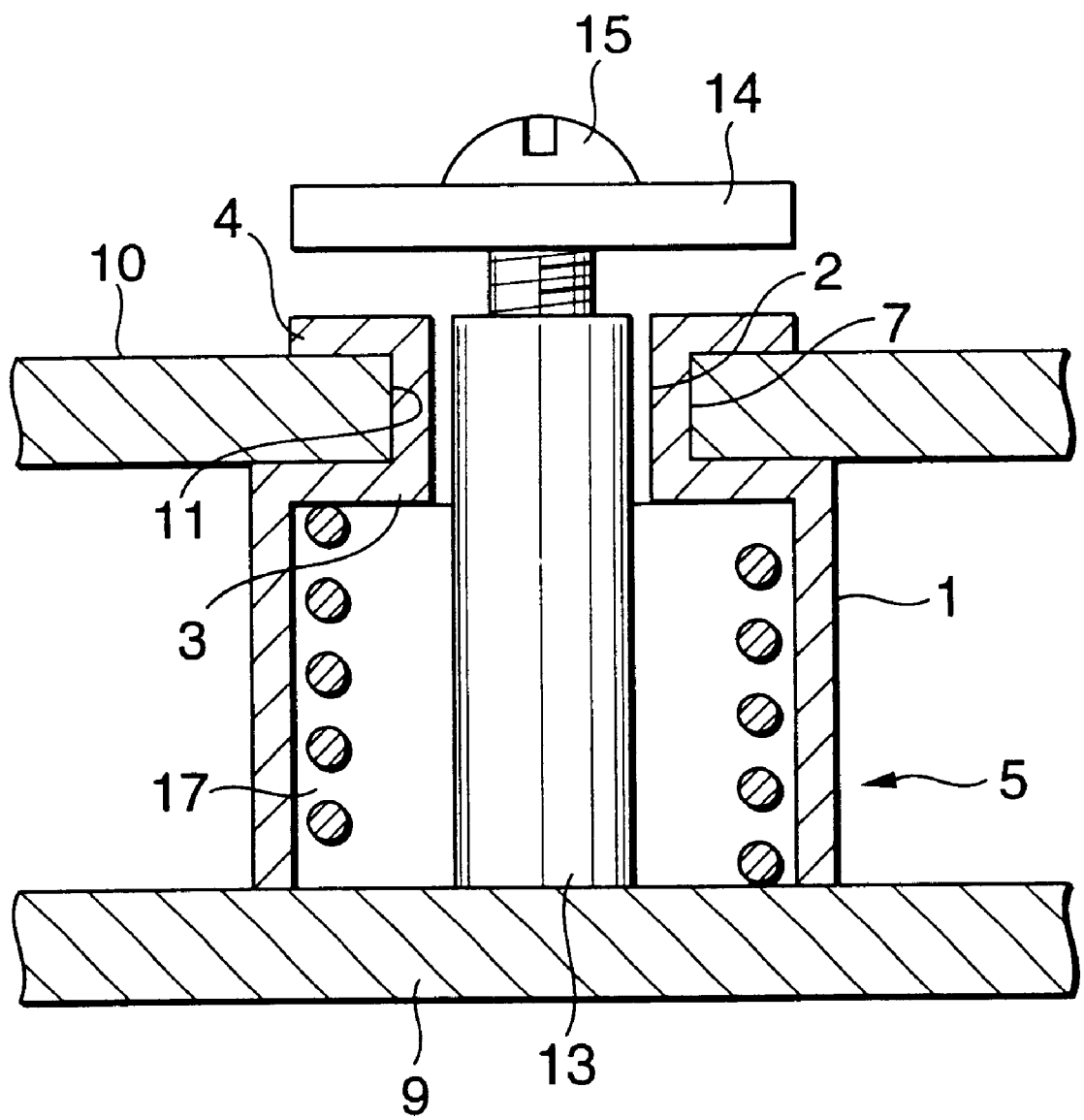

VIBRATION-PREVENTIVE SUPPORT DEVICE

BACKGROUND OF THE INVENTION

1. Field of the Invention

The present invention relates to a vibration-preventive support device which, when connecting and supporting two members one of which is movable with respect to the other, can prevent the vibration of one member from being transmitted to the other.

2. Description of the Related Art

Conventionally, a vibration-preventive support device for connecting and supporting two members in a vibration-preventive manner is structured, for example, in such a manner as shown in FIG. 7. That is as shown in FIG. 7, the conventional vibration-preventive support device comprises a large-diameter cylindrical portion 1, a small-diameter cylindrical portion 2 situated upwardly of the large-diameter cylindrical portion 1, a ring-shaped connecting portion 3 for connecting together the large-diameter cylindrical portion 1 and small-diameter cylindrical diameter cylindrical portion 1 and small-diameter cylindrical portion 2, and a ring-shaped flange portion 4 formed on the upper end portion of the small-diameter cylindrical portion 2. The large-diameter cylindrical portion 1, small-diameter cylindrical portion 2, ring-shaped connecting portion 3 and ring-shaped flange portion 4 are formed together in an integrally united body by molding elastic material such as rubber or the like, thereby producing a vibration-preventive support device 5.

Further, the small-diameter cylindrical portion 2, ring-shaped connecting portion 3 and ring-shaped flange portion 4 cooperate together in forming a fitting recess portion 7 having a U-shaped cross section, and there is formed a through-hole 11 in a movable member 10 which is capable of moving with respect to a fixed body 9; and, the portion of the movable member 10 that is situated in the peripheral edge of the through-hole 11 is fitted or inserted into the fitting recess portion 7 to thereby mount the movable member 10 onto the vibration-preventive support device 5. On the other hand, there is provided a boss 13 on the fixed member 9; and, the boss 13 is loosely fitted into the large-diameter cylindrical portion 1 and small-diameter cylindrical portion 2 from below, and a screw 15 with a washer 14 is threadedly engaged with the boss 13 to thereby mount the fixed member 9 onto the vibration-preventive support device 5.

In this state, within the large-diameter cylindrical portion 1 and outside the boss 13, there is arranged an auxiliary spring 17. Also, between the washer 14 and the flange portion 4 of the vibration-preventive support device 5, there is formed a clearance in consideration of the movement of the movable member 10.

However, since the above-described conventional vibration-preventive support device 5 is structured such that the movable member 10 is raised up by the large-diameter cylindrical portion 1 and small-diameter cylindrical portion 2 connected together by the connecting portion 3, in order to prevent the large-diameter cylindrical portion 1 and small-diameter cylindrical portion 2 from buckling, the auxiliary spring 17 is indispensably necessary; but, the existence of the auxiliary spring 17 makes it impossible to lower the natural vibration frequency of the vibration-preventive support device 5, which results in the lowered vibration damping performance thereof. Also, the auxiliary spring 17 gives rise to an increase in the number of parts, thereby leading to an increase in the manufacturing cost of the vibration-preventive support device 5.

By the way, as the vibration-preventive support device which is formed of rubber or the like, there are proposed several devices which are disclosed, for example, in Japanese Patent Unexamined Publication No. Hei. 7-37375, Japanese Patent Unexamined Publication No. Hei. 8-63952, and the like. However, in all of them, the device is designed such that it is engaged with a pair of engaging members disposed in a mutually opposing manner within a casing to thereby support a frame and, therefore, the device is complicated in structure.

SUMMARY OF THE INVENTION

The present invention aims at eliminating the drawbacks found in the above-described conventional vibration-preventive support devices. Accordingly, it is an object of the invention to provide a vibration-preventive support device which is simple in structure and can provide an excellent vibration damping performance.

In attaining the above object, according to the invention, there is provided a vibration-preventive support device, comprising: an outer cylindrical body to be mounted onto one of two members to be connected together, the outer cylindrical body being formed of elastic material; an inner cylindrical body disposed within the outer cylindrical body to be mounted onto the other member movable with respect to the one member, the inner cylindrical body being formed of elastic material; and a vibration absorbing body formed of elastic material and disposed such that the two ends thereof are respectively connected to one end side end edge of the outer cylindrical body and the other end side end edge of the inner cylindrical body.

According to this structure, since the two ends of the vibration absorbing body are respectively connected to one end side end edge of the outer cylindrical body and the other end side end edge of the inner cylindrical body, out of the two members to be connected and supported, the movable-side member can be supported in such a manner that it is hung. Thanks to this, not only there is eliminated the need for provision of an auxiliary spring which has been conventionally used when the movable-side member is lifted up and supported, but also vibrations can be effectively absorbed by the vibration absorbing body, which makes it possible to connect and support the two members in a vibration-preventive manner.

BRIEF DESCRIPTION OF THE DRAWINGS

FIG. 7 is a sectional side view of a conventional vibration-preventive support device.

DETAILED DESCRIPTION OF THE PREFERRED EMBODIMENT

Figure 1:
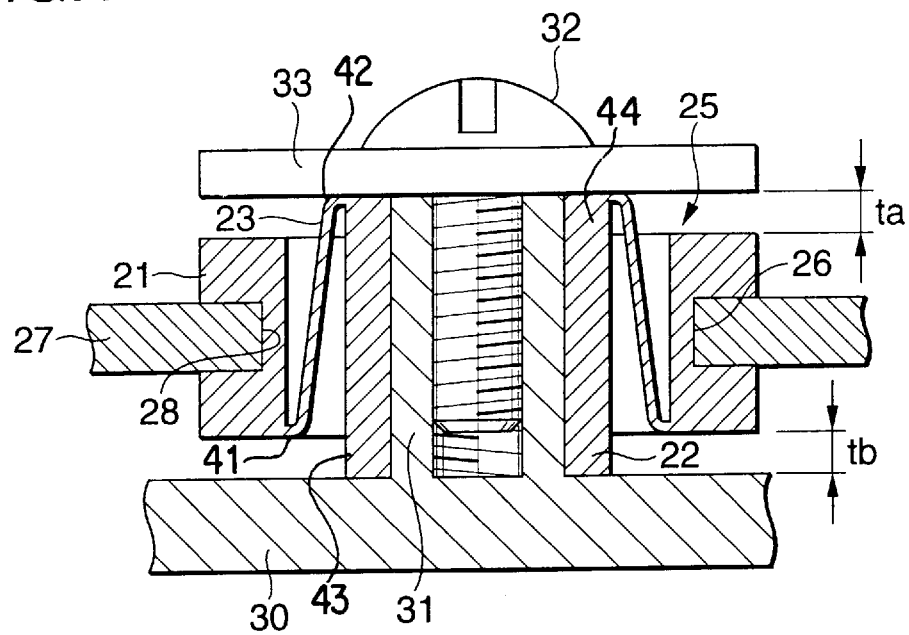
FIG. 1 is a sectional side view of an embodiment of a vibration-preventive support device according to the invention.
Figure 2:
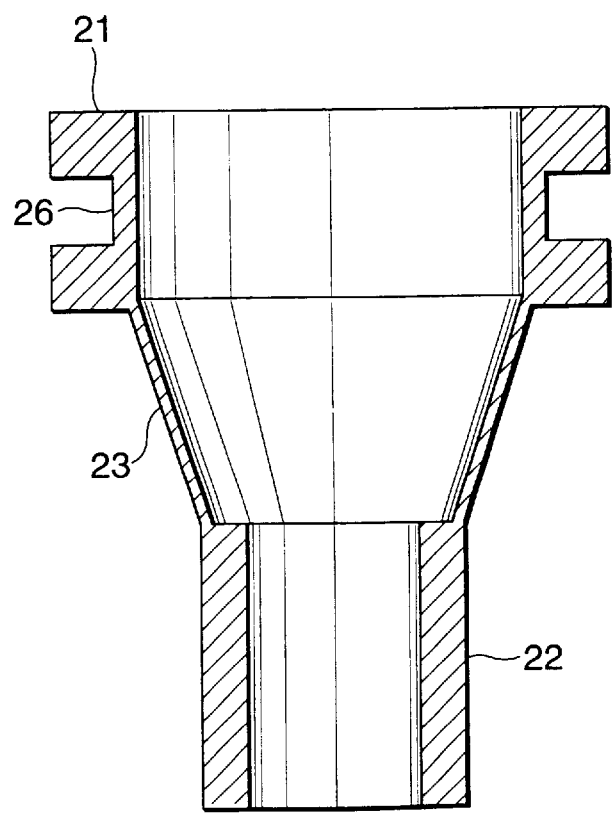
FIG. 2 is a sectional side view of a portion of the embodiment, showing a state thereof.
Figure 3:
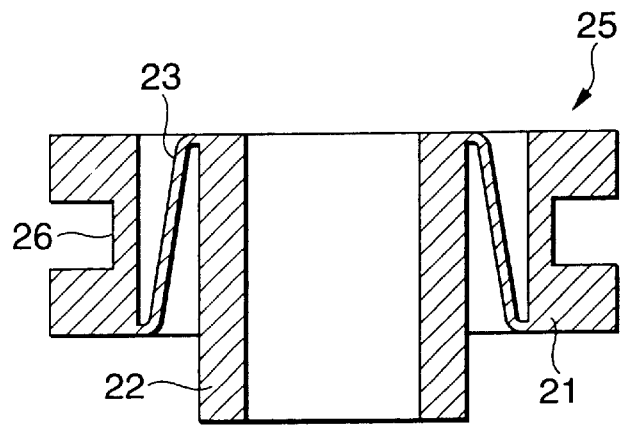
FIG. 3 is a sectional side view of the above portion of the embodiment, showing another state thereof.
Figure 4:
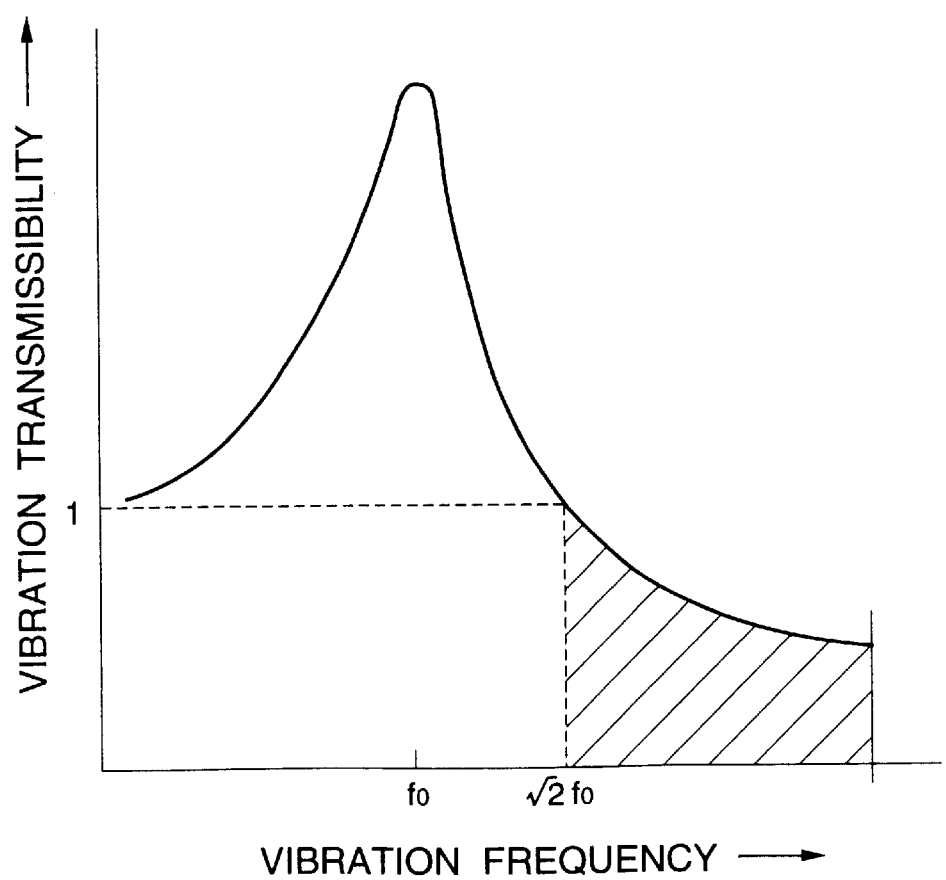
FIG. 4 is an explanatory view of the operation of the embodiment.
Figure 5:
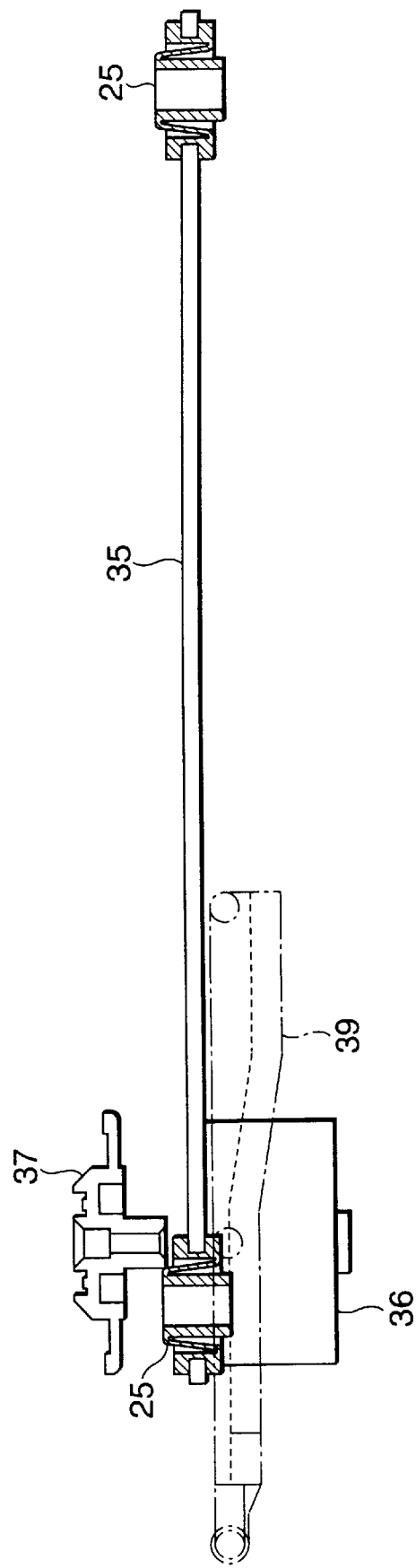
FIG. 5 is a side view of an application of the embodiment, showing a state thereof.
Figure 6:
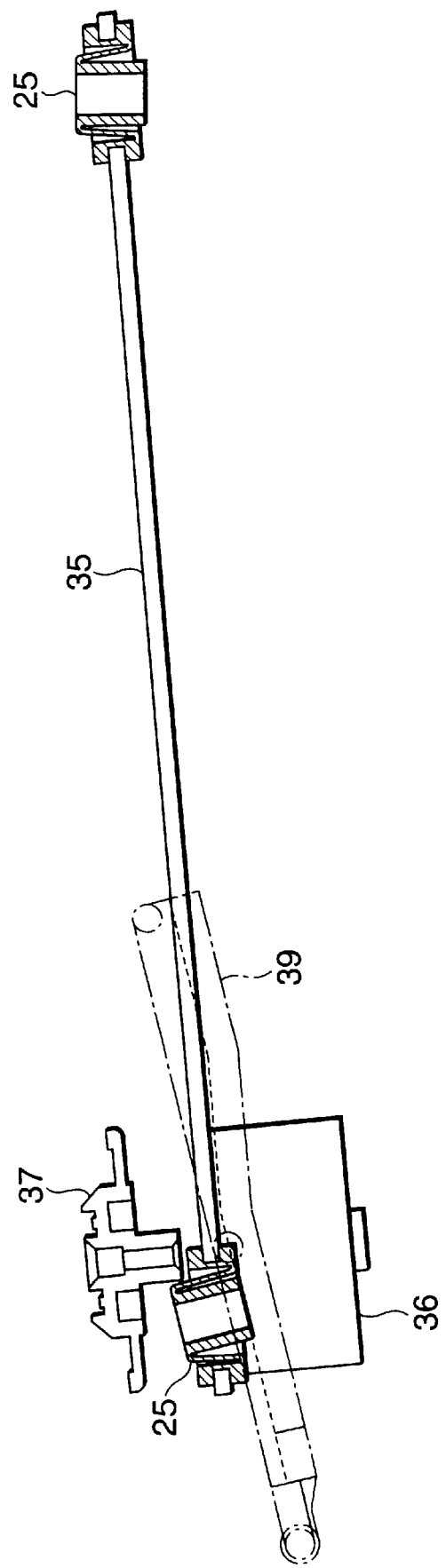
FIG. 6 is a side view of the above application of the embodiment, showing another state thereof.

Now, description will be given below of an embodiment of a vibration-preventive support device according to the invention with reference to FIGS. 1 through 6. By the way, FIG. 1 is a sectional side view of the present vibration-preventive support device; FIGS. 2 and 3 are respectively sectional side views of a portion of the vibration-preventive support device, respectively showing mutually different states thereof; FIG. 4 is an explanatory view of the operation of the vibration-preventive support device; and FIGS. 5 and 6 are respectively side views of an application of the embodiment of the vibration-preventive support device, showing the respective operations of the application in different states thereof.

In FIGS. 1 through 3, references character 21 designates an outer cylindrical body, 22 designates an inner cylindrical body which is dispose within the outer cylindrical body 21, and 23 designates a funnel-shaped vibration absorbing body with two ends of which are respectively connected to the lower end side end edge 41 of the outer cylindrical body 21 and the upper end side and edge 42 of the inner cylindrical body 22. Further, the outer cylindrical by 21, inner cylindrical body 22 and vibration absorbing body 23 are formed together in an integrally united body by molding rubber which is one of elastic material. In this molding operation, the outer cylindrical body 21, inner cylindrical body 22 and vibration absorbing body 23 are formed in such a manner that, as shown in FIG. 2, the whole of the inner cylindrical body 22 is projected externally of the outer cylindrical body 21; and, after then, as shown in FIG. 3, if the inner cylindrical body 22 is pushed into the inside of the outer cylindrical body 21, then there can be obtained a vibration-preventive support device 25.

Further, in FIGS. 1 through 3, reference character 26 designates a groove which is formed in the outer periphery of the outer cylindrical body 21 in such a manner to extend in the peripheral direction thereof, 27 designates a movable member serving as one member, and 28 designates a circular through-hole which is formed in the movable member 27 in such a manner that it extends through the movable member 27; and, in order that the portion of the movable member 27 situated along the peripheral edge of the through-hole 28 can be fitted and inserted into the groove 26, the outer cylindrical body 21 is inserted through the through-hole 28 and is thereby mounted onto the movable member 27.

Also, reference character 30 designates a fixed member serving as the other member, 31 designates a cylindrical boss which is formed in the fixed member 30 in such a manner that it is formed integrally with the fixed member 30 and faces upwardly and also with the outer surface of which the inner cylindrical body 22 is fitted from above, and 32 designates a screw serving as a fastening member; and, the screw 32 includes a washer 33 used as a hold member having a diameter substantially equal to the outside diameter of the outer cylindrical body 21, while the screw 32 is threadedly engaged with a female screw formed in the inner periphery of the boss 31 from above, that is, from a direction in which it is fitted with the outer surface of the female screw, and is thereby mounted on the boss 31 in such a manner that the inner cylindrical body 22 is held by and between the washer 33 and fixed member 30.

Further, if the outer cylinder body 21 is inserted through the through-hole 28 and the movable member 27 portion situated along the peripheral edge of the through-hole 28 is fitted into the groove 26, then the movable member 27 can be supported by the outer cylindrical body 21 in such a manner that the former is hung down by the latter. Also, if the movable member 27 is supported in this hanging manner, then the load of the movable member 27 is applied to the outer cylindrical body 21 and, therefore, the vibration absorbing body 23 is pulled downward and is thereby extended to some extent, so that the outer cylindrical body 21 is lowered accordingly and thus the two end portions 43, 44 of the inner cylindrical body 22 respectively projected out from their associated ends of the outer cylindrical body 21. The thickness and the hardness of the material such as rubber or the like of the vibration absorbing body 23 have been previously selected in such a manner that, in the above projected states thereof, the projection amounts ta and tb of the two end portions of the inner cylindrical body 22 are substantially equal to each other.

By the way, the natural vibration frequency $f_o$ of the vibration absorbing body 23 from portion of the vibration-preventive support device in the vertical direction thereof is normally expressed by the following numeric expression (1), while the natural vibration frequency $f_o$ draws such a curve line as shown in FIG. 4. In the numeric expression (1), $\delta$ expresses an amount of flexure of the vibration absorbing body 23 its initial value and, specifically, one of the projection amounts ta and tb of the two end portions of the inner cylindrical body 22 which is smaller is used as the flexure amount of the vibration absorbing body 23. Also, in FIG. 4, the horizontal axis shows the vibration frequency of the vibration absorbing body 23, while the vertical axis shows the vibration transmissibility thereof.

$$f_o=15.76(1/\delta)^{1/2} \tag{1}$$

In this case, an area, which is shown by hatching in FIG. 4 and provides the vibration transmissibility of less than 1, is a range which is normally used. If the flexure amount $\delta$ is set as large as possible, that is, if the projection amounts ta and tb of the two end portions of the inner cylindrical body 22 are set as large as possible, then the natural vibration frequency fo can be lowered and thus a high vibration damping performance can be obtained in the low vibration frequency range; but, if the projection amounts ta and tb of the two end portions of the inner cylindrical body 22 are set large in this manner, then the periphery of the vibration-preventive support device 25 becomes large in size, which is not desirable.

Therefore, preferably, the hardness of the vibration absorbing body 23 may be adjusted by selecting the thickness and rubber material of the vibration absorbing body 23 properly in such a manner that the projection amounts ta and tb of the two end portions of the inner cylindrical body 22 can be set almost equal to each other as well as set so small as to be able to prevent any interference with the movement of the movable member 27. This can prevent the peripheral portion of the vibration-preventive support device 25 serving as a support portion from becoming large in size to thereby be able to make effective use of space, which makes it possible for the vibration-preventive support device 25 to have a high vibration damping performance.

Further, the thus structured vibration-preventive support device 25 can be applied to, for example, the periphery of a chucking mechanism provided in a CD player; that is, if it is applied to a support portion of a mechanism for moving up and down a turn table which chucks a disk and rotationally drives the same, then there can be obtained such a structure as shown in FIGS. 5 and 6. That is, as shown in FIGS. 5 and 6, the rear end portion of a drive chassis 35 disposed within a box-shaped loading chassis (not shown) of the CD player is supported by the vibration-preventive support device 25 so as to be rotatable with respect to the loading chassis and, on the vertically movable front end of the drive chassis 35, there are mounted a motor 36 and a turn table 37 which is fixed to the shaft of the motor 36. In this structure, the drive chassis 35 corresponds to the movable member 27 and the loading chassis corresponds to the fixed member 30.

Also, as shown in FIGS. 5 and 6, within the loading chassis, there is disposed a lift arm 39 which provides a plan view of an almost U shape. Specifically, the two sides of the rear end portion of the lift arm 39 are rotatably supported on the two side surfaces of the loading chassis, while the front end portion of the lift arm 39 is supported by a guide portion formed inside the front surface of the loading chassis in such a manner that it can be moved up and down; and, in linking with the backward and forward movements of a tray which is moved when the disk is inserted into the loading chassis and is discharged out of the loading chassis, the front end portion of the lift arm 39 is moved up and down. The right and left front end portions of the drive chassis 35 are respectively connected to and supported on the almost central portions of the right and left end portions of the lift arm 39 by the vibration-preventive support device 25.

In the disk chucked state, as shown in FIG. 5, the drive chassis 35 and lift arm 39 are held almost in the horizontal condition. On the other hand, in the disk unchucked state, as shown in FIG. 6, the front end portions of the drive chassis 35 and lift arm 39 are moved downward; however, in this case, since the downward movement amount of the front end portion of the lift arm 39 is larger than the downward movement amount of the lift arm 39, assuming that the lift arm 39 is fixed, it can be considered that the drive chassis 35 is relatively moved with respect to the lift arm 39.

That is, if the support portion of the drive chassis 35 with respect to the loading chassis as well as the connecting portion between the drive chassis 35 and lift arm 39 are supported by the vibration-preventive support device 25 in this manner, then even if any vibrations are applied to the loading chassis and these vibrations are transmitted to the lift arm 39, the transmission of the vibrations to the drive chassis 35 can be virtually cut off by the vibration-preventive support device 25 to thereby prevent the rotation of the disk by the turn table 37 from being disturbed due to the vibrations, which in turn makes it possible to secure the stable driving of rotation of the disk.

Therefore, according to the above-described embodiment, since the movable member 27 is hung and supported by the outer cylindrical body 21, not only the buckling of the outer cylindrical body 21 can be prevented even without using a buckling-preventive auxiliary spring which has been used conventionally, but also the vibrations of the movable member 27 can be effectively absorbed by the vibration absorbing body 23, which makes it possible to connect and support the two members, that is, the movable member 27 and fixed member 30 in a vibration-preventive manner. That is, if the vibration-preventive support device according to the present embodiment is applied to a vibration-preventive structure which is disposed in the periphery of the chucking mechanism of the CD player, then the stable driving of rotation of the disk, which is free from frightening sounds caused by the vibrations, can be realized in a simple manner.

Also, simply by forming the peripherally extending groove 26 in the outer periphery of the outer cylindrical body 21, the movable member 27 can be supported easily. Also, after the outer cylindrical body 21, inner cylindrical body 22 and vibration absorbing body 23 are formed together in an integrally united body in such a manner that the whole of the inner cylindrical body 22 is projected outwardly of the outer cylindrical body 21, the inner cylindrical body 22 may be simply pushed into the inside of the outer cylindrical body 21. Thanks to this, the outer cylindrical body 21, inner cylindrical body 22 and vibration absorbing body 23 can be formed together in an integrally united body with no need to work these components into a complicated shape, and the excellent vibration damping performance of the vibration-preventive support device can be obtained by a simple structure.

By the way, in the above-described embodiment, description has been given of a case in which the movable member 27 is mounted on the outer cylindrical body 21 and the fixed member 30 is mounted on the inner cylindrical body 22, but this is not limitative, for example, a fixed side member can also be mounted on the outer cylindrical body 21 and a movable side member can be mounted on the inner cylindrical body 22. In this case, preferably, the two ends of the vibration absorbing body 23 may be respectively connected to the upper end side end edge of the outer cylindrical body 21 and the lower end side end edge of the inner cylindrical body 22. With use of this structure, the movable side member can be supported by the inner cylindrical body 22 in such a manner that the former is hung by the latter.

Also, in the above-described embodiment, description has been given of the application of the invention to the vibration-preventive structure which is employed in the periphery of the chucking mechanism of the CD player. However, of course, the invention can also apply to other vibration-preventive structures than that employed in the periphery of the chucking mechanism of the CD player and, in all of them, there can be obtained effects equivalent to those of the above-described embodiment.

Further, it goes without saying that the boss 31 shown in FIG. 1 can also be formed in the fixed member 30 in such a manner as to face downward and the screw 32 can be threadedly engaged with the boss 31 from below.

Further, the invention is not limited to the above-described embodiment but other various changes and modifications than those described hereinabove are also possible without departing from the scope and spirit of the invention.

As has been described heretofore, according to the invention, since, out of the two members to be connected and supported, the movable side member can be supported in such a manner that it is hung, not only there is eliminated the need for provision of such an auxiliary spring for prevention of buckling as has been conventionally used, but also vibrations can be effectively absorbed by the vibration absorbing body to thereby be able to connect and support the two members in a vibration-preventive manner, which makes it possible to provide a vibration-preventive support device which is simple in structure and is excellent in the vibration damping performance.

What is claimed is:

1. A vibration-preventive support device, comprising:
    an outer cylindrical body having a longitudinal axis along a gravitational direction, said outer cylindrical body to be mounted onto a first member of two members to be connected together, said outer cylindrical body being formed of elastic material;
    an inner cylindrical body to be mounted onto a second member of said two members movable with respect to said first member, said inner cylindrical body being formed of elastic material; said outer cylindrical body having a first side end edge and a second side end edge and said inner cylindrical body having a first side end edge and a second side end edge; and
    a vibration absorbing body formed of elastic material having two ends that are respectively connected to said first side end edge of said outer cylindrical body and to said second side end edge of said inner cylindrical body wherein, in a first condition, said inner cylindrical body is entirely outside a volume encompassed by said outer cylindrical body and wherein, in a second condition, said inner cylindrical body is disposed within said encompassed volume of said outer cylindrical body and, in said second condition, said first side end edge and said second side end edge of said outer cylindrical body are positioned proximal to respective said first side end edge and said second side end edge of said inner cylindrical body, and wherein said absorbing body expands a predetermined length due to weight of said second member and supports the second member through said outer cylindrical body in said second condition.

2. The vibration-preventive support device as set forth in claim 1, wherein said inner cylindrical body has two end portions which are respectively projected by almost the same amount from the two side end edges of said outer cylindrical body when a load is applied to said inner cylindrical body or said outer cylindrical body.

3. The vibration-preventive support device as set forth in claim 1, wherein said outer cylindrical body, said inner cylindrical body, and said vibration absorbing body are formed in an integrally united body.

4. The vibration-preventive support device as set forth in claim 1, wherein the first side end edge of said inner cylindrical body is an upper end side edge and the second side end edge of said inner cylindrical body is a lower end side edge.

5. The vibration-preventive support device as set forth in claim 4, wherein said outer cylindrical body includes a groove formed in the outer periphery thereof so as to extend in the peripheral direction thereof, said first member includes a through-hole formed so as to extend therethrough, in order that the portion of said first member situated along the peripheral edge of the through-hole can be fitted and inserted into the groove, said outer cylindrical body is inserted through the through-hole and said outer cylindrical body is thereby mounted onto the first member, said second member includes a boss, said inner cylindrical body is fitted with the outer surface of the boss, a fastening member including a hold member having a diameter almost equal to the outside diameter of said outer cylindrical body is fastened to the boss from the direction in which said inner cylindrical body is fitted with the outer surface of the boss, and said inner cylindrical body is mounted on the boss in such a manner that said inner cylindrical body is held by and between the hold member and said second member.

6. The vibration-preventive support device as set forth in claim 1, wherein the first side end edge of said inner cylindrical body is a lower side end edge and said second side end edge of said inner cylindrical body is an upper side end edge.

7. The vibration-preventive support device as set forth in claim 6, wherein said outer cylindrical body includes a groove formed in the outer periphery thereof so as to extend in the peripheral direction thereof, said first member includes a through-hole formed so as to extend therethrough, in order that the portion of said first member situated along the peripheral edge of the through-hole can be fitted and inserted into the groove, said outer cylindrical body is inserted through the through-hole and said outer cylindrical body is thereby mounted onto the first member, said second member includes a boss, said inner cylindrical body is fitted with the outer surface of the boss, a fastening member including a hold member having a diameter almost equal to the outside diameter of said outer cylindrical body is fastened to the boss from the direction in which said inner cylindrical body is fitted with the outer surface of the boss, and said inner cylindrical body is mounted on the boss in such a manner that said inner cylindrical body is held by and between the hold member and said second member.

* * * * *